United States Patent
Ozawa

(10) Patent No.: US 11,148,524 B2
(45) Date of Patent: Oct. 19, 2021

(54) RECEPTACLE CAP AND VEHICLE

(71) Applicant: TOYOTA JIDOSHA KABUSHIKI KAISHA, Toyota (JP)

(72) Inventor: Shuhei Ozawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/912,406

(22) Filed: Jun. 25, 2020

(65) Prior Publication Data

US 2020/0324645 A1 Oct. 15, 2020

Related U.S. Application Data

(63) Continuation of application No. 16/236,777, filed on Dec. 31, 2018, now Pat. No. 10,780,774.

(30) Foreign Application Priority Data

Jan. 17, 2018 (JP) .............................. JP2018-005312

(51) Int. Cl.
| | |
|---|---|
| *B60K 15/04* | (2006.01) |
| *F17C 13/06* | (2006.01) |
| *B60K 15/03* | (2006.01) |
| *F17C 1/00* | (2006.01) |

(52) U.S. Cl.
CPC .... *B60K 15/0406* (2013.01); *B60K 15/03006* (2013.01); *F17C 1/00* (2013.01);
(Continued)

(58) Field of Classification Search
CPC .......... B60K 15/0406; B60K 15/03006; B60K 2015/03019; F17C 1/00; F17C 13/06;
(Continued)

(56) References Cited

U.S. PATENT DOCUMENTS

| | | | |
|---|---|---|---|
| 2,058,118 | A | 10/1932 | White |
| 2,111,031 | A | 3/1938 | Lee |

(Continued)

FOREIGN PATENT DOCUMENTS

| | | |
|---|---|---|
| JP | 2007-196920 A | 8/2007 |
| JP | 2016-094123 A | 5/2016 |
| WO | 2010/067444 A1 | 6/2010 |

OTHER PUBLICATIONS

Notice of Allowance issued in U.S. Appl. No. 16/236,777 dated Oct. 30, 2020.

*Primary Examiner* — J. Gregory Pickett
*Assistant Examiner* — Niki M Eloshway
(74) *Attorney, Agent, or Firm* — Dickinson Wright, PLLC

(57) ABSTRACT

A cap includes a bottomed first cover portion, and a second cover portion provided on a receiving opening side of the first cover portion. The second cover portion includes an outside cover that covers a contact portion of a receptacle. The contact portion comes into contact with a distal end of a supply nozzle when the supply nozzle is connected with the receptacle. The outside cover has a tapered shape such that an outer diameter of the outside cover is decreased towards the first cover portion from one end of the cap where the receiving opening is provided. The outside cover has an internal dimension that allows the outside cover to be separated from an outer peripheral portion of the receptacle when the cap is attached to the receptacle.

4 Claims, 7 Drawing Sheets

(52) U.S. Cl.
CPC .... *F17C 13/06* (2013.01); *B60K 2015/03019* (2013.01); *F17C 2205/0311* (2013.01); *F17C 2221/012* (2013.01); *F17C 2270/0178* (2013.01); *F17C 2270/0184* (2013.01)

(58) Field of Classification Search
CPC ........ F17C 2205/0311; F17C 2221/012; F17C 2270/0178; F17C 2270/0184
USPC ................................................ 220/86.2, 562
See application file for complete search history.

(56) References Cited

U.S. PATENT DOCUMENTS

| | | |
|---|---|---|
| 2,653,747 A | 9/1953 | Maida |
| 4,279,320 A | 7/1981 | Brandl |
| 4,762,247 A | 8/1988 | Temmesfeld |
| 5,365,985 A | 11/1994 | Todd |
| D371,427 S | 7/1996 | Harris |
| 6,230,918 B1 | 5/2001 | Huynh |
| RE37,776 E * | 7/2002 | Foltz ..................... B60K 15/04 141/325 |
| 6,446,826 B1 | 9/2002 | Foltz |
| 2009/0309386 A1 | 12/2009 | Yamamoto |
| 2010/0207046 A1 | 8/2010 | Wenchell |
| 2011/0247726 A1 | 10/2011 | Okawachi |
| 2013/0206757 A1 | 8/2013 | Nagai |
| 2015/0048087 A1* | 2/2015 | Hagano ..................... F16K 1/50 220/86.2 |
| 2015/0291022 A1* | 10/2015 | Kobayashi ......... B60K 15/0406 220/86.2 |
| 2016/0137057 A1 | 5/2016 | Onishi et al. |

* cited by examiner

COMPARATIVE EXAMPLE

COMPARATIVE EXAMPLE

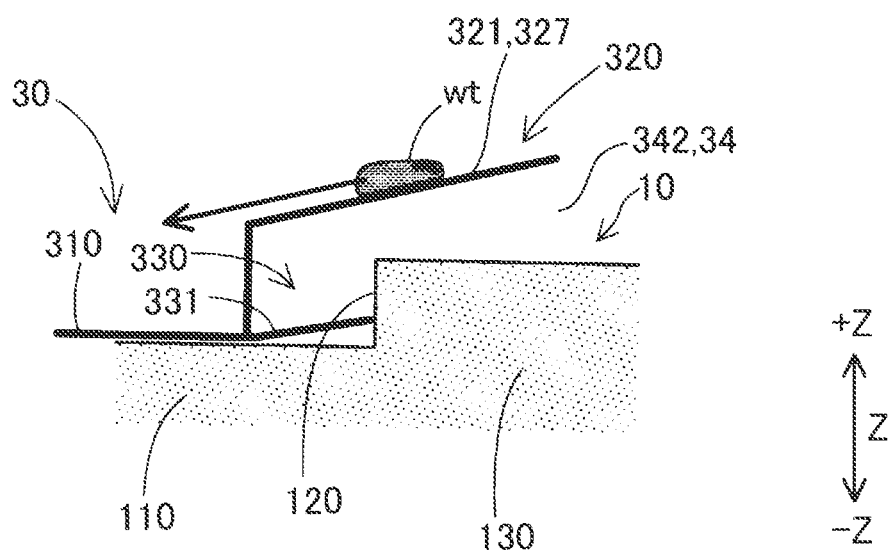
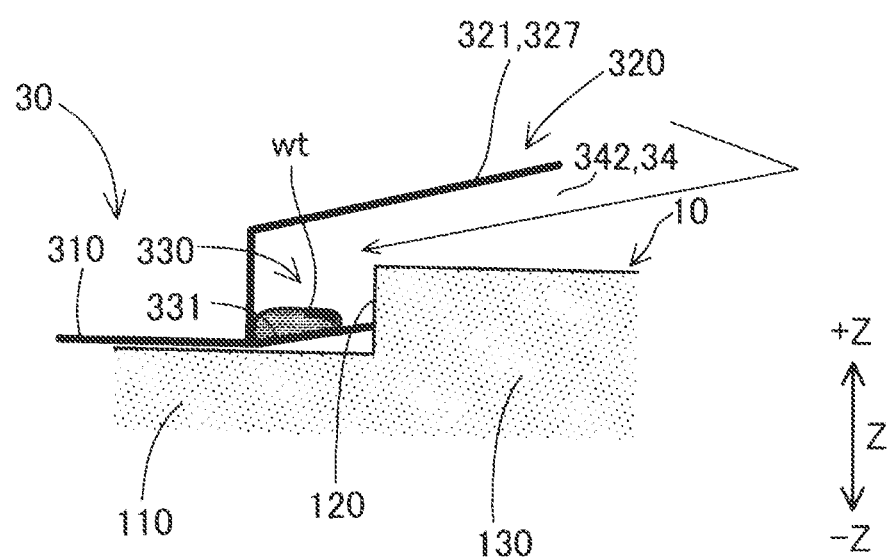

RECEPTACLE CAP AND VEHICLE

INCORPORATION BY REFERENCE

This application is a continuation of U.S. application Ser. No. 16/236,777, filed Dec. 31, 2018, and claims priority from Japanese Patent Application No. 2018-005312 filed on Jan. 17, 2018 the entire disclosures of each of which are hereby incorporated by reference.

BACKGROUND

1. Technical Field

The disclosure relates to a technique for a cap attached to a receptacle in a detachable manner, and a vehicle.

2. Description of Related Art

There is known a cap that is attached to a receptacle (a filling port) in a detachable manner, the receptacle being configured to fill high-pressure fuel gas that is used for a fuel cell (for example, Japanese Unexamined Patent Application Publication No. 2016-094123 (JP 2016-094123 A) and WO 2010067444). As a supply nozzle for high-pressure fuel gas is connected with the receptacle from which the cap is removed, the high-pressure fuel gas is supplied to a vehicle from the supply nozzle through the receptacle.

SUMMARY

With regard to the receptacle to which the cap is attached, there are instances where rain and so on causes water to be stuck on a portion of the receptacle that comes into contact with the supply nozzle. When the supply nozzle is connected with the receptacle while water is stuck on the contact portion, the supply nozzle and the receptacle could be fixed to each other as the stuck water freezes. The stuck water can freeze when, for example, hydrogen gas serving as the high-pressure fuel gas is cooled to zero degree Celsius or lower and supplied to the receptacle from the supply nozzle. Therefore, the disclosure provides a technique that reduces the possibility that water is stuck on the portion of the receptacle that comes into contact with the supply nozzle.

(1) A first aspect of the disclosure relates to a cap that includes a receiving opening to be attached to a receptacle such that the cap is attached to the receptacle in a detachable manner. The receiving opening is provided in one end of the cap, and the receptacle is configured to fill high-pressure fuel gas. The cap includes a first cover portion with a bottom, and a second cover portion provided on a side of the receiving opening with respect to the first cover portion. The second cover portion includes an outside cover that covers a contact portion of the receptacle. The contact portion of the receptacle comes into contact with a distal end of a supply nozzle for the high-pressure fuel gas when the supply nozzle is connected with the receptacle. The outside cover has a tapered shape such that an outer diameter of the outside cover is decreased towards the first cover portion from the one end of the cap where the receiving opening is provided. The outside cover has an internal dimension that allows the outside cover to be separated from an outer peripheral portion of the receptacle in a state where the cap is attached to the receptacle. With the aspect, since the outside cover coves the contact portion of the receptacle, it is possible to reduce the possibility that water is stuck on the contact portion. Also, with the aspect, even when water reaches the outside cover, the water that has reached the outside cover is allowed to move to the first cover portion side. Therefore, it is possible to reduce the possibility that water reaches the contact portion through the receiving opening. Also, with the cap according to the first aspect, the outside cover is separated from the outer peripheral portion of the receptacle. Therefore, even when water flows in between the outside cover and the receptacle, the water that has flown in is allowed to flow outside. Thus, it is possible to restrain water from staying between the outside cover and the receptacle, thereby further reducing the possibility that water is stuck on the contact portion.

(2) The second cover portion may further include an inside cover and a groove portion. The inside cover may be formed in an inner periphery of the cap on an inner side of the outside cover, and the groove portion may be formed by the outside cover and the inside cover. With the aspect, even when water reaches between the outside cover and the outer peripheral portion, the water that has reached there is allowed to flow in the groove portion. Thus, it is possible to further reduce the possibility that water is stuck on the contact portion.

(3) The inside cover may have a length that allows a distal end of the inside cover to be in contact with the contact portion, and a tapered shape such that an outer diameter of the inside cover is decreased towards an opposite side of the contact portion in the state where the cap is attached to the receptacle. With the aspect, because of the inside cover, it is possible to further reduce the possibility that water that flows into the groove portion is stuck on the contact portion.

(4) A second aspect of the disclosure relates to a vehicle in which high-pressure fuel gas is used. The vehicle includes a receptacle and a cap. The receptacle is configured to fill the high-pressure fuel gas, and the cap includes a receiving opening to be attached to the receptacle such that the cap is attached to the receptacle in a detachable manner. The receiving opening is provided in one end of the cap. The cap includes a bottomed first cover portion, and a second cover portion provided on a side of the receiving opening with respect to the first cover portion. The second cover portion includes an outside cover that covers a contact portion of the receptacle. The contact portion of the receptacle comes into contact with a distal end of a supply nozzle for the high-pressure fuel gas when the supply nozzle is connected with the receptacle. The outside cover has a tapered shape such that an outer diameter of the outside cover is decreased towards the first cover portion from the one end of the cap where the receiving opening is provided. The outside cover has an internal dimension that allows the outside cover to be separated from an outer peripheral portion of the receptacle in the state where the cap is attached to the receptacle. With the aspect, since the outside cover covers the contact portion of the receptacle, it is possible to reduce the possibility that water is stuck on the contact portion. Also, with the aspect, even when water reaches the outside cover, the water that has reached the outside cover is allowed to move to the first cover portion side. Therefore, it is possible to reduce the possibility that water reaches the contact portion through the receiving opening. Also, with the aspect, the outside cover is separated from the outer peripheral portion of the receptacle. Therefore, even when water flows in between the outside cover and the receptacle, the water that has flown in is allowed to flow outside. Thus, it is possible to restrain water from staying between the outside cover and the receptacle, thereby further reducing the possibility that water is stuck on the contact portion.

(5) An upper portion of the outside cover being positioned above the receptacle may slope downward from the first end to the first cover portion in the state where the cap is attached to the receptacle. With the aspect, even when water reaches the upper portion, the water that has reached the upper portion is allowed to move to the side of the first cover portion smoothly. Therefore, it is possible to further reduce the possibility that water reaches the contact portion through the receiving opening.

The disclosure can be carried out in various forms other than above, for example, in a form of a unit having a cap and a receptacle other than the cap and the vehicle described above.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 9 is a first schematic view describing a moving pathway of water that flows into a lid box according to the embodiment;

FIG. 10 is a second schematic view describing a moving pathway of water that flows into the lid box according to the embodiment;

DETAILED DESCRIPTION OF EMBODIMENTS

A. Embodiment

Figure 1:
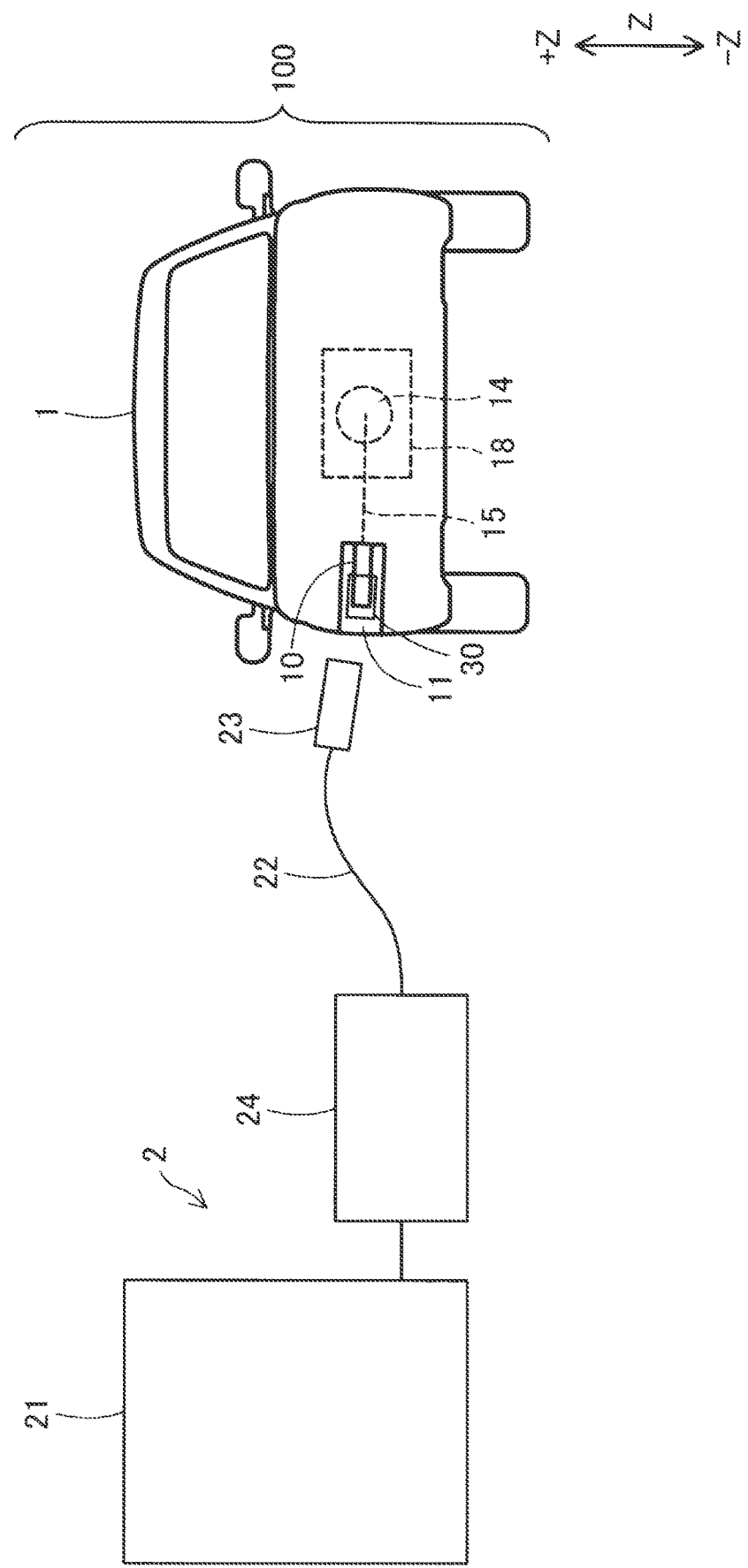
FIG. 1 is a view describing a vehicle and a gas station as an embodiment of the disclosure.

FIG. 1 is a view describing a vehicle and a gas station as an embodiment of the disclosure. In FIG. 1, a Z axis direction is a direction along a vertical direction. Also, a +Z axis direction is an upward direction, and −Z direction is a downward direction. A vehicle 1 and a gas station 2 configure a gas filling system 100. The vehicle 1 is a vehicle that uses high-pressure fuel gas. Specifically, the vehicle 1 is a fuel cell vehicle on which a fuel cell 18 is mounted as an energy source. The fuel cell 18 generates electricity by an electrochemical reaction between oxidant gas and fuel gas that serves as the high-pressure fuel gas.

The gas station 2 includes a filling device 21 that sends out the high-pressure fuel gas towards a downstream side, and a pre-cooler 24 that cools the high-pressure fuel gas. A filling hose 22 is connected with the filling device 21. A supply nozzle 23 that can be connected with a later-described receptacle 10 of the vehicle 1 is attached to an end portion of the filling hose 22. The pre-cooler 24 cools the high-pressure fuel gas sent out from the filling device 21 down to about −30° C. that is below zero degree Celsius. The cooled high-pressure fuel gas is supplied to the receptacle 10 by the supply nozzle 23.

The vehicle 1 includes the receptacle 10, a cap 30, a fuel pipe 15, a fuel tank 14, and a fuel cell 18. The receptacle 10 is disposed inside a lid box 11. When the high-pressure fuel gas is filled in the fuel tank 14, the supply nozzle 23 is connected with the receptacle 10. The cap 30 is attached to the receptacle 10 in a detachable manner. When the supply nozzle 23 is connected with the receptacle 10, the cap 30 is removed from the receptacle 10. The fuel pipe 15 is connected with the receptacle 10 and the fuel tank 14. The high-pressure fuel gas supplied to the receptacle 10 flows inside the fuel pipe 15 and is filled in the fuel tank 14. The high-pressure fuel gas filled in the fuel tank 14 is supplied to the fuel cell 18 for the fuel cell 18 to generate electricity.

Figure 2:
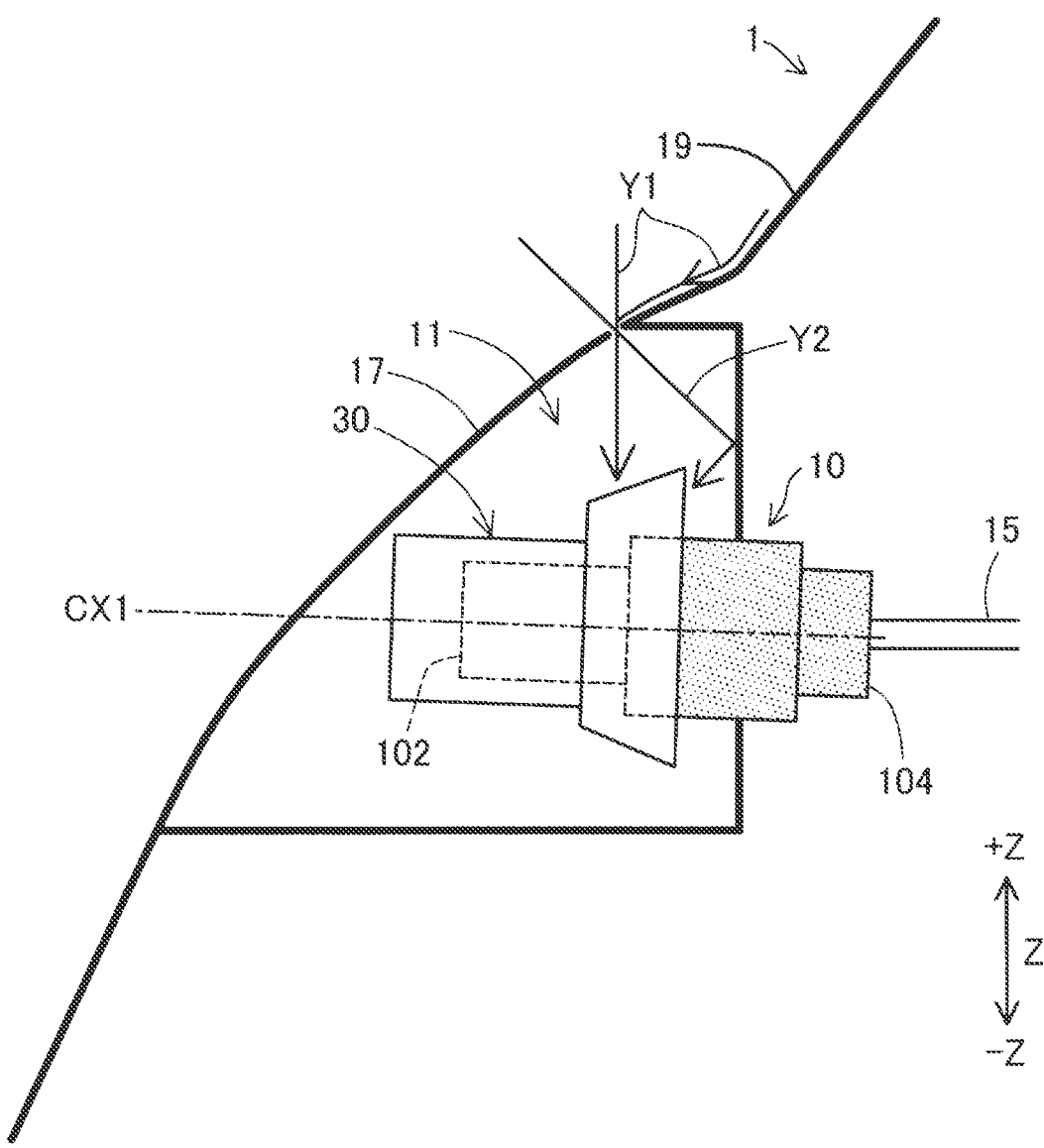
FIG. 2 is a schematic view of a vicinity of a receptacle of the vehicle.

FIG. 2 is a schematic view of the vicinity of the receptacle 10 in the vehicle 1. The receptacle 10 has a central axis CX1. In a state where the vehicle 1 is located on a horizontal surface, the central axis CX1 is tilted with respect to a horizontal direction by about two degrees so that a distal end 102 side is positioned higher than a base end 104 side. When a user connects the supply nozzle 23 with the distal end 102 side of the receptacle 10, the user opens a lid 17 of the lid box 11, and removes the cap 30 from the receptacle 10. This is when water can flow into the lid box 11 from outside. For example, there are instances where water flows into the lid box 11 from a gap between the lid 17 and a vehicle body 19 as shown by arrows Y1, Y2 while the vehicle 1 is being washed or traveling in a rainy weather. Water that flows into the lid box 11 can reach the receptacle 10 and the cap 30. For example, water shown by the arrows Y1 moves downward through the gap between the lid 17 and the vehicle body 19 due to force of gravity. Also, for example, water shown by the arrow Y2 passes the gap between the lid 17 and the vehicle body 19, hits and splashes on a wall of the lid box 11, and then moves towards the cap 30 side.

Figure 3:
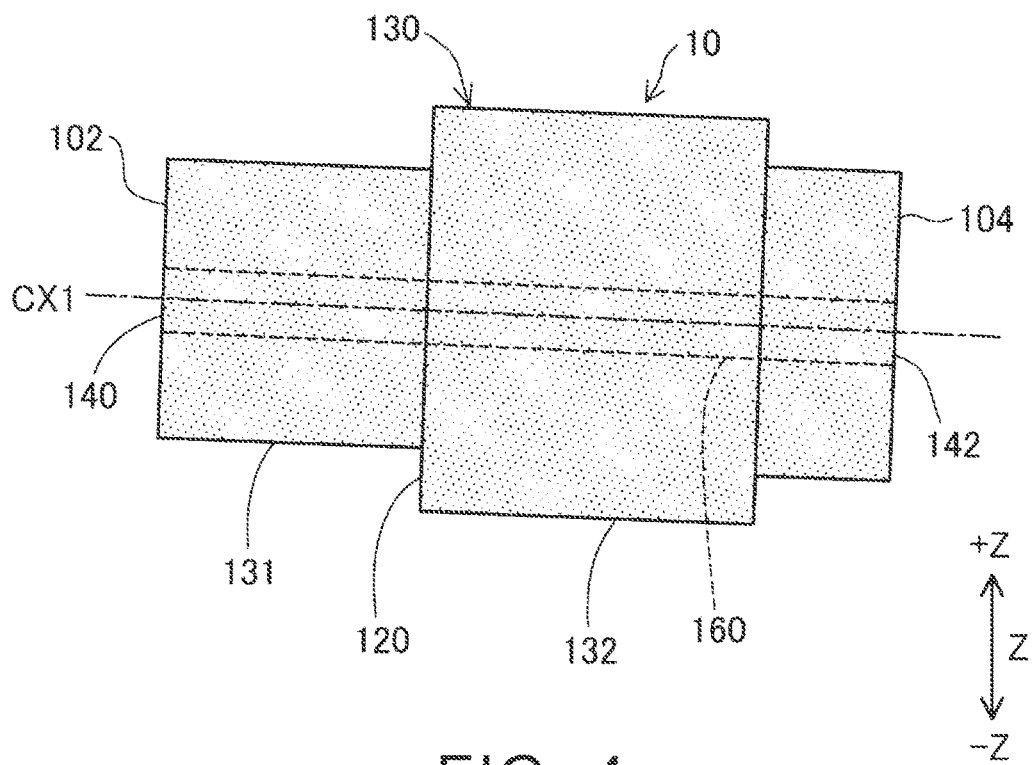
FIG. 3 is a schematic external view of the receptacle.

FIG. 3 is an external schematic view of the receptacle 10. The receptacle 10 includes a distal end 102, a base end 104, an outer peripheral portion 130, and a distribution flow passage 160. The distal end 102 is positioned on an outer side of the vehicle body 19 with respect to the base end 104 (FIG. 2). The distal end 102 includes a distal end opening 140 in which the high-pressure fuel gas supplied from the supply nozzle 23 is introduced. The base end 104 faces the distal end 102. The base end 104 includes a connection opening 142 to which the fuel pipe 15 is connected. The outer peripheral portion 130 connects the distal end 102 and the base end 104 with each other, and forms an outer peripheral surface about the central axis CX. A section of the outer peripheral portion 130 orthogonal to the central axis CX1 has an almost circular shape. The outer peripheral portion 130 includes a first outer peripheral portion 131 positioned on the distal end 102 side, and a second outer peripheral portion 132 connected with the first outer peripheral portion 131. An outer diameter of the second outer peripheral portion 132 is lager than that of the first outer peripheral portion 131. Because of the difference in outer diameter, the outer peripheral portion 130 has a contact portion 120 as a level difference in a boundary between the first outer peripheral portion 131 and the second outer peripheral portion 132. When the supply nozzle 23 is connected with the receptacle 10, the contact portion 120 comes into contact with the supply nozzle 23 (specifically, a distal end of the supply nozzle 23) in an attaching direction of the supply nozzle 23. The attaching direction of the supply nozzle 23 to the receptacle 10 is parallel to the central axis CX1 of the receptacle 10. The distribution flow passage 160 is a flow passage where the distal end opening 140 serves as a first end, and the connection opening 142 serves as a second end. The high-pressure fuel gas supplied from the supply nozzle 23 flows in the distribution flow passage 160.

Figure 4:
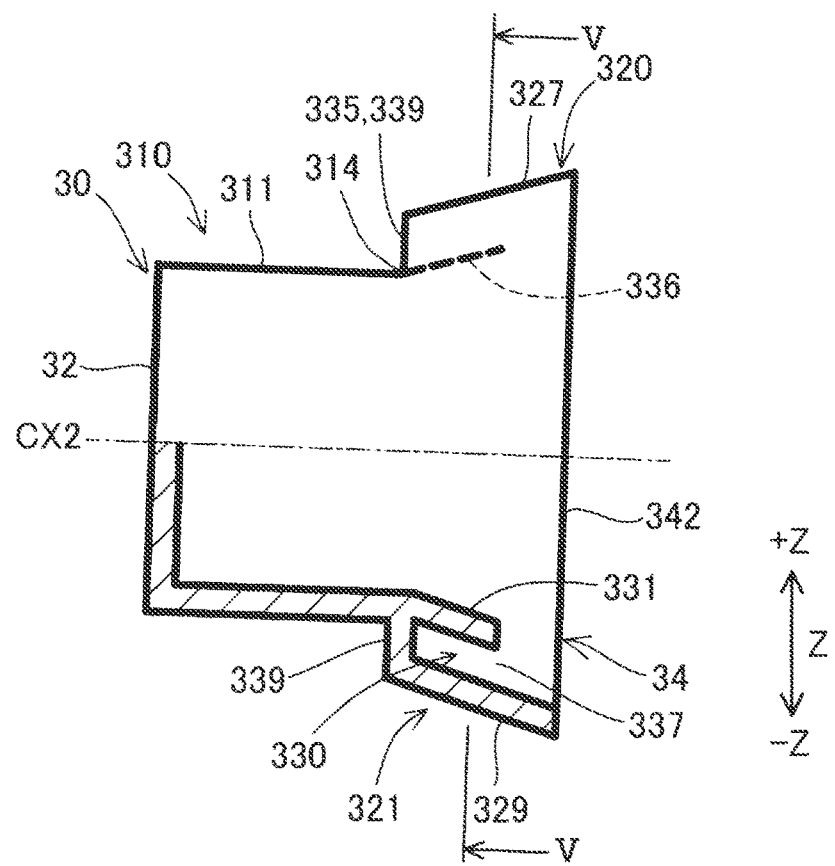
FIG. 4 is a partially broken sectional view of a cap.
Figure 5:
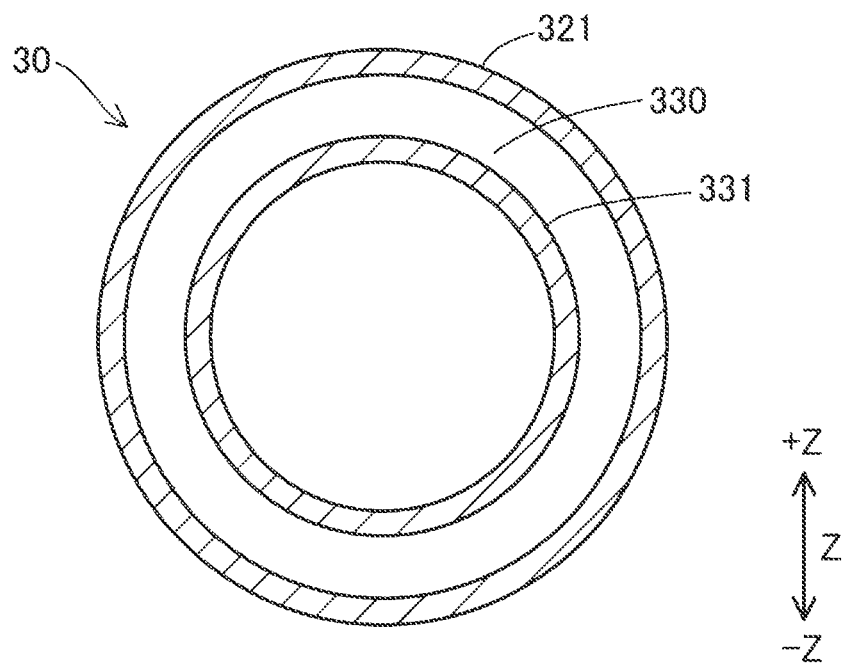
FIG. 5 is a sectional view taken along the line V-V shown in FIG. 4.

FIG. 4 is a partially broken sectional view of the cap 30. FIG. 5 is a sectional view taken along the line V-V in FIG. 4. A receiving opening 342 to be attached to the receptacle 10 is provided in a first end 34 of the cap 30 (FIG. 4), and the cap 30 is thus attached to the receptacle 10 in a detachable manner. Also, the cap 30 has a bottomed shape in which a second end 32 forms a bottom portion.

The cap 30 includes a bottomed first cover portion 310 having the second end 32, and a second cover portion 320 provided on the receiving opening 342 side with respect to the first cover portion 310. The first cover portion 310 has a body portion 311 that extends from a peripheral edge portion of the second end 32 towards the first end 34. In a state where the cap 30 is attached to the receptacle 10 (an attached state), the first cover portion 310 covers a distal end side portion of the receptacle 10 including the distal end 102. In the embodiment, in the attached state, the first cover portion 310 covers a portion of the first outer peripheral portion 131 (FIG. 3), the portion being on the distal end 102 side with respect to the contact portion 120.

The second cover portion 320 includes the first end 34 of the cap 30. The receiving opening 342 receives the receptacle 10 when the cap 30 is attached to the receptacle 10. In the second cover portion 320, a connecting portion 335 that is positioned on the second end 32 side is connected with an end portion 314 of the first cover portion 310 on the first end 34 side. The connecting portion 335 is a portion extending outward from the end portion 314 of the body portion 311.

The second cover portion 320 further includes an outside cover 321, an inside cover 331, and a groove portion 330. The outside cover 321 connects the connecting portion 335 and the first end 34, and the inside cover 331 is formed in an inner periphery of the cap 30 on an inner side of the outside cover 321. The groove portion 330 is formed between the outside cover 321 and the inside cover 331.

A section of the outside cover 321 orthogonal to a central axis CX2 of the cap 30 has a circular shape. The outside cover 321 has a tapered shape so that an outer diameter of the outside cover 321 becomes smaller towards the first cover portion 310 from the first end 34 where the receiving opening 342 is provided. In the embodiment, in the attached state, the outer diameter of the outside cover 321 is decreased so that a position of an upper portion 327 of the outside cover 321 becomes lower towards the first cover portion 310 side. The upper portion 327 is a portion that is positioned above the outer peripheral portion 130 of the receptacle 10 in the attached state. Also, the outer diameter of the outside cover 321 is decreased so that a position of a lower portion 329 of the outside cover 321 becomes higher towards the first cover portion 310 side in the attached state. The lower portion 329 is a portion that is positioned below the outer peripheral portion 130 of the receptacle 10 in the attached state. The outside cover 321 covers the contact portion 120 in the attached state.

In the attached state, the inside cover 331 faces the outer peripheral portion 130 (specifically, the first outer peripheral portion 131), and surrounds the outer peripheral portion 130. A section of the inside cover 331 orthogonal to the central axis CX2 of the cap 30 has a circular shape. The inside cover 331 has a tapered shape so that an outer diameter of the inside cover 331 is decreased towards an opposite side of the contact portion 120 (towards the first cover portion 310 side). The inside cover 331 also has a length that allows a distal end of the inside cover 331 on the first end 34 side to come into contact with the contact portion 120 in the attached state. In the embodiment, the outer diameter of the inside cover 331 is decreased so that a position of an upper portion 336 of the inside cover 331 becomes lower towards the first cover portion 310 in the attached state. Because of tolerance, there may be a small gap between the distal end of the inside cover 331 and the contact portion 120.

The groove portion 330 includes an outer side wall formed by the outside cover 321, an inner side wall formed by the inside cover 331, a bottom portion 339, and an opening 337. The inner side wall is the same member as the inside cover 331. The opening 337 is an opening formed on the first end 34 side. The bottom portion 339 faces the opening 337. The bottom portion 339 is formed by the connecting portion 335.

Figure 6:
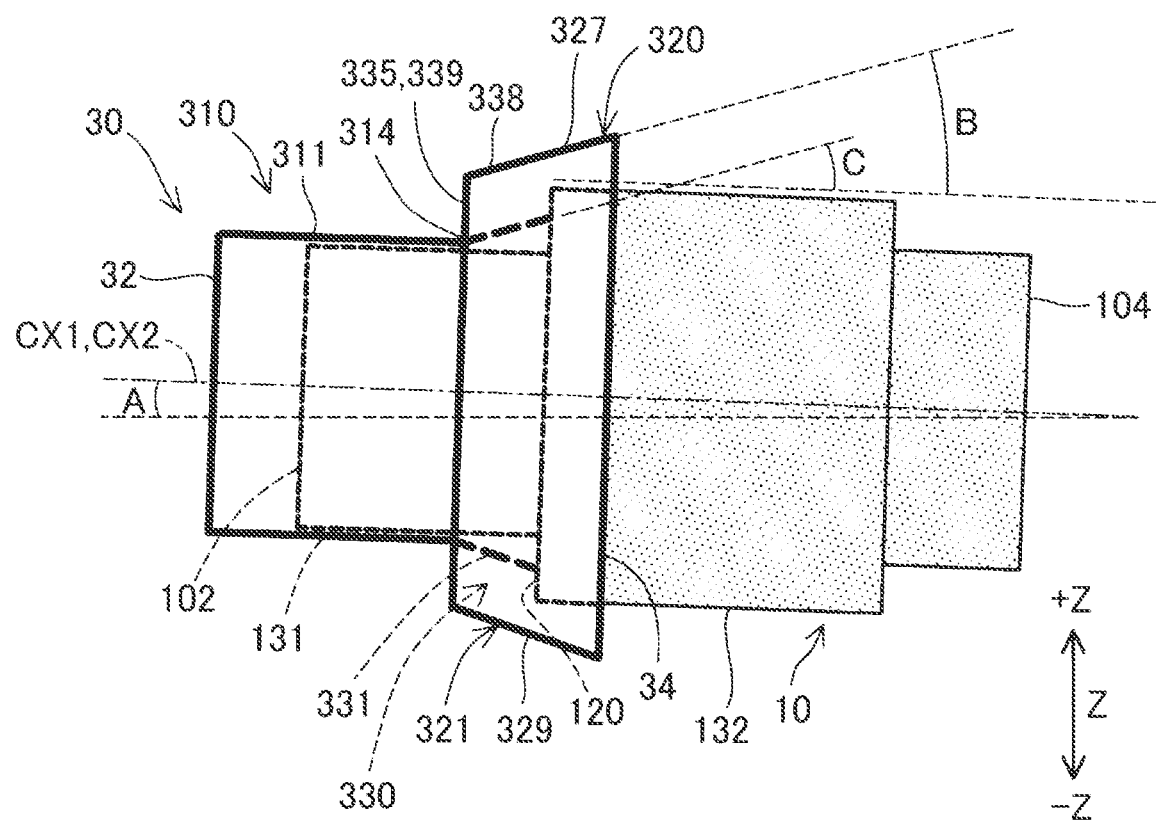
FIG. 6 is a schematic view of a state where the cap is attached to the receptacle.

FIG. 6 is a schematic view when the cap 30 is attached to the receptacle 10. In the attached state, the central axis CX1 of the receptacle 10 and the central axis CX2 of the cap 30 coincide with each other. In the attached state, the outside cover 321 of the second cover portion 320 covers the contact portion 120 as the outside cover 321 extends from a position on the distal end 102 side of the contact portion 120 to a position on the base end 104 side of the contact portion 120. Specifically, the outside cover 321 covers the contact portion 120 by surrounding the contact portion 120 around the central axis CX1.

In the receptacle 10 mounted on the vehicle 1, the central axis CX1 is tilted with respect to the horizontal direction by a predetermined angle A (two degrees in the embodiment) so that the distal end 102 side is positioned higher than the base end 104 side. In the attached state, an angle B formed by the central axis CX1 and the outside cover 321 is larger than the angle A. The angle B is, for example, three degrees or larger, more preferably five degrees or larger, and even more preferably ten degrees or larger. Since the value of the angle B is larger than that of the angle A, the upper portion 327 of the outside cover 321 is inclined so that the position of the upper portion 327 is lowered from the first end 34 side towards the first cover portion 310 side (the second end 32 side) in the attached state. Further, similarly to the angle B, an angle C formed by the central axis CX1 and the inside cover 331 of the groove portion 330 is larger than the angle A. The angle C is, for example, three degrees or larger, more preferably five degrees or larger, and even more preferably ten degrees or larger. Because the value of the angle C is larger than that of the angle A, a portion of the inside cover 331 that surrounds the first outer peripheral portion 131, the portion being above the outer peripheral portion 130, is inclined so that a position of the portion of the inside cover 331 becomes lower towards the first cover portion 310 side (the second end 32 side) from the first end 34 side in the attached state.

Further, the outside cover 321 of the second cover portion 320 is disposed at an interval from the outer peripheral portion 130 of the receptacle 10 in the attached state. This means that the outside cover 321 has an internal dimension such that the outside cover 321 is separated from the outer peripheral portion 130 of the receptacle 10 in the attached state. Specifically, the outside cover 321 is disposed at an interval from the outer peripheral portion 130 of the receptacle 10, and the interval has a size that prevents water from being retained between the outside cover 321 and the outer peripheral portion 130 of the receptacle 10 due to surface tension.

Figure 7:
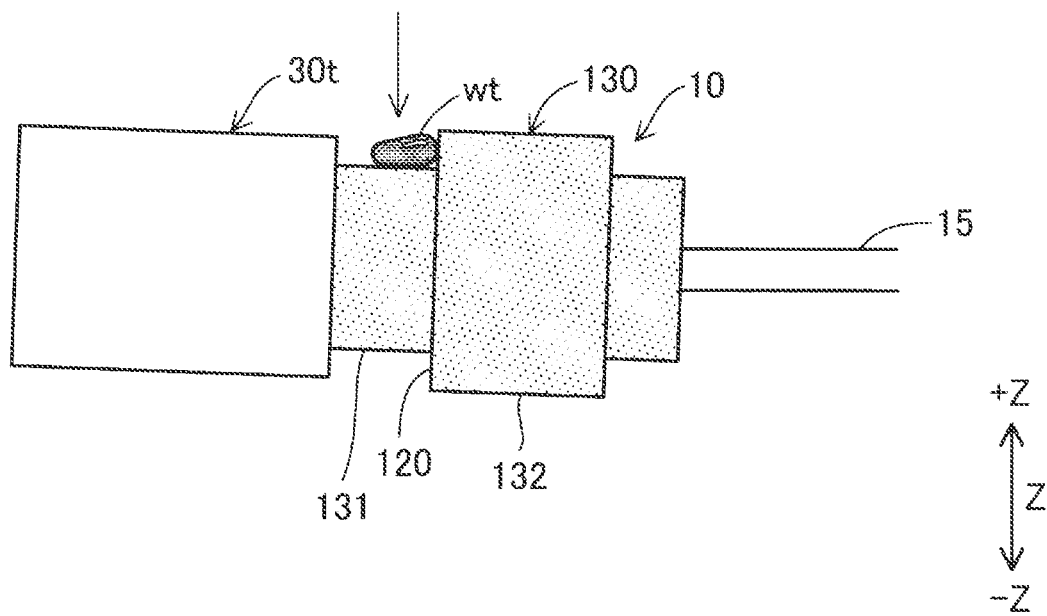
FIG. 7 is a view describing a cap according to a comparative example.
Figure 8:
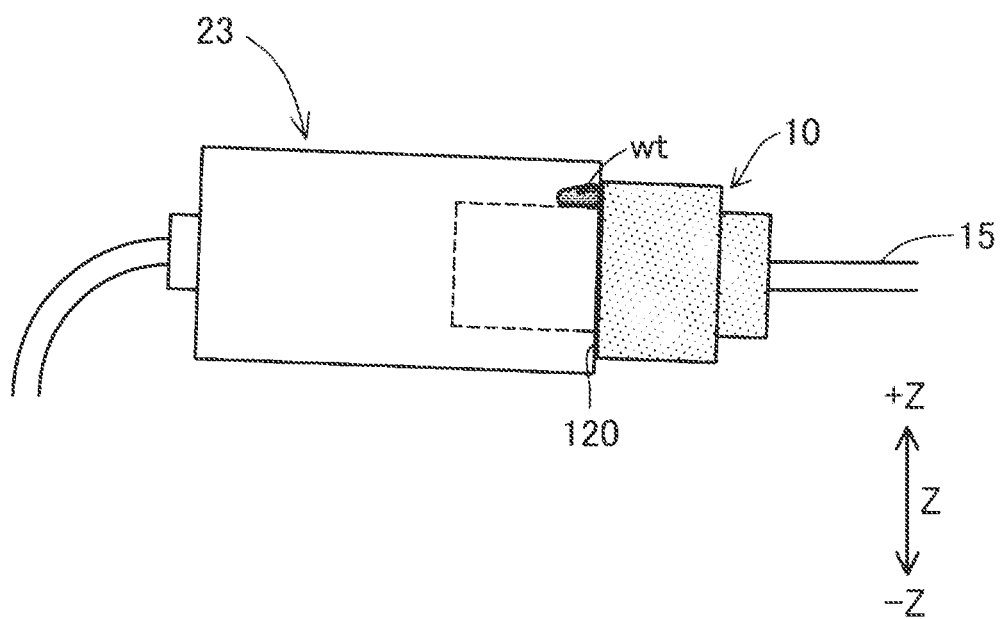
FIG. 8 is a view describing the comparative example.

FIG. 7 is a view describing a cap 30t according to a comparative example. FIG. 8 is a view describing the comparative example. A difference from the cap 30 according to the embodiment is that the cap 30t does not have the second cover portion 320 (FIG. 4). As shown in FIG. 7, the cap 30t covers the first outer peripheral portion 131 in the attached state. On the other hand, the cap 30t does not cover the contact portion 120 in the attached state. When water flows into the lid box 11 while the vehicle 1 is traveling in a rainy weather, is being washed, and so on, a part of the water wt can be stuck on the contact portion 120 or the vicinity of the contact portion 120. As shown in FIG. 8, when the cap 30t is removed from the receptacle 10 and the supply nozzle 23 is connected with the receptacle 10 in a state where the water wt remains stuck on the contact portion 120 or the vicinity of the contact portion 120, the following phenomenon can happen. When high-pressure fuel gas cooled down to zero degree Celsius or lower is supplied to the receptacle 10 through the supply nozzle 23, temperature of the receptacle 10 is decreased, and the stuck water wt can freeze. As the water wt freezes, the receptacle 10 and the supply nozzle 23 are fixed to each other, and it becomes difficult to remove the supply nozzle 23 from the receptacle 10.

FIG. 9 is a first schematic view describing a moving pathway of water that flows into the lid box 11 according to the embodiment. In the embodiment, when water flows into the lid box 11, a part of the water wt moves downwardly towards the contact portion 120 of the receptacle 10. However, in the embodiment, since the outside cover 321 of the second cover portion 320 covers the contact portion 120, it is possible to reduce the possibility that the water wt is stuck on the contact portion 120. Further, the outside cover 321 has the tapered shape so that the outer diameter of the outside cover 321 becomes smaller towards the first cover portion 310 from the first end 34. Thus, water wt that reaches the outside cover 321 moves towards the first cover portion 310 side as shown by an arrow. This means that it is possible to reduce the possibility that the water wt that reaches the outside cover 321 moves to the base end 104 side (the receiving opening 342 side). Therefore, it is possible to reduce the possibility that water reaches the contact portion 120 through the receiving opening 342. Furthermore, the upper portion 327 of the outside cover 321 is inclined so that the position of the upper portion 327 becomes lower towards the first cover portion 310 side from the first end 34 side. Thus, even when water reaches the upper portion 327, water that reaches the upper portion 327 is smoothly moved to the first cover portion 310 side. Hence, it is possible to further reduce the possibility that water reaches the contact portion 120 through the receiving opening 342.

Figure 11:
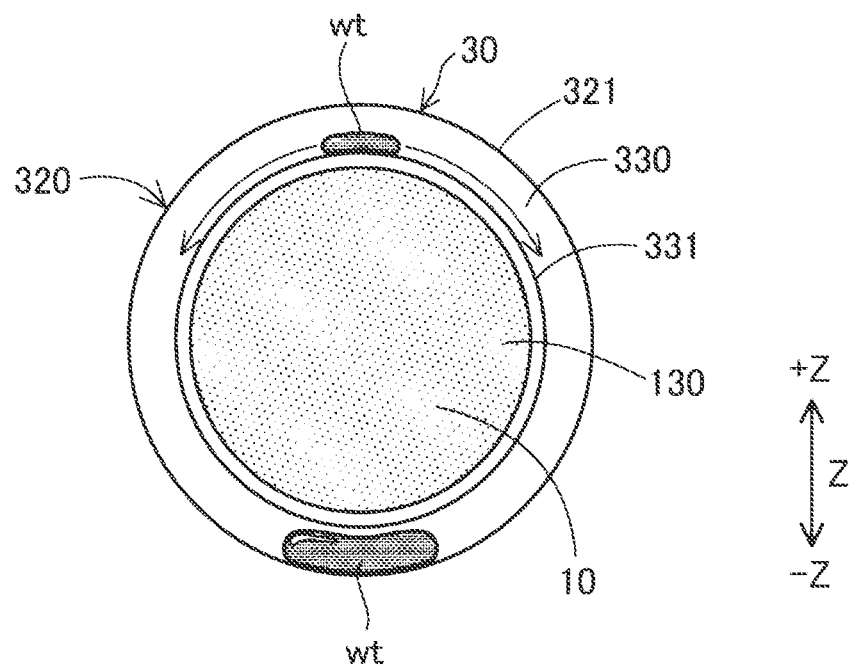
FIG. 11 is a third schematic view describing moving pathways of water that flows into the lid box according to the embodiment.
Figure 12:
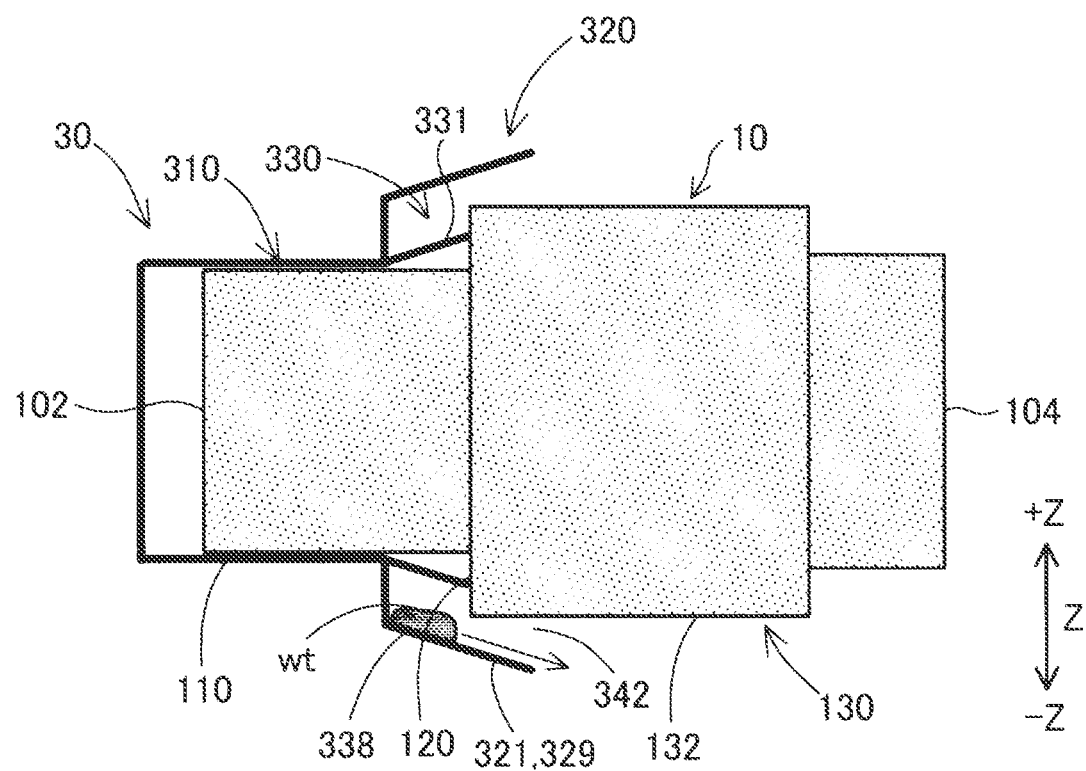
FIG. 12 is a fourth schematic view describing a moving pathway of water that flows into the lid box according to the embodiment.

FIG. 10 is a second schematic view describing a moving pathway of water that flows into the lid box 11 according to the embodiment. FIG. 11 is a third schematic view describing moving pathways of water that flows into the lid box 11 according to the embodiment. FIG. 12 is a fourth schematic view describing a moving pathway of water that flows into the lid box 11 according to the embodiment. FIG. 11 is a sectional view of a portion where the water wt is located in FIG. 10 among sections orthogonal to the central axis CX2.

As shown in FIG. 10, in the embodiment, when water flows into the lid box 11, a part of water wt reaches a gap between the outside cover 321 and the outer peripheral portion 130 through the receiving opening 342 as shown by the arrow. However, the cap 30 has the groove portion 330 that communicates with the receiving opening 342. The inside cover 331 that forms the inner side wall of the groove portion 330 has the length that allows the distal end of the inside cover 331 to come into contact with the contact portion 120. The inside cover 331 also has the tapered shape so that the outer diameter of the inside cover 331 becomes smaller towards the opposite side of the contact portion 120. Therefore, water wt that reaches the gap is allowed to flow into the groove portion 330. Further, the water wt that flows into the groove portion 330 is restrained from moving to the contact portion 120 side. Therefore, it is possible to reduce the possibility that the water wt is stuck on the contact portion 120 and the vicinity of the contact portion 120 of the outer peripheral portion 130. Also, as shown in FIG. 11, because the groove portion 330 surrounds the outer peripheral portion 130, the water wt that flows in a portion of the groove portion 330 above the outer peripheral portion 130 (an upper groove portion) moves downwardly along the groove portion 330 due to force of gravity. Furthermore, because the inner side wall of the groove portion 330 has the tapered shape, the water wt that flows in the upper groove portion is restrained from moving to the contact portion 120 side. Thus, it is possible to further reduce the possibility that water wt flowing into the groove portion is stuck on the contact portion 120.

Further, as shown in FIG. 12, the outside cover 321 has the internal dimension that makes the outside cover 321 separated from the outer peripheral portion 130 in the attached state. Thus, as shown in FIG. 11, the water wt that moves downwardly along the groove portion 330 flows outside the cap 30 through a gap between the receiving opening 342 and the outer peripheral portion 130 as shown in FIG. 12. This means that it is possible to restrain water from staying between the outside cover 321 and the receptacle 10, thereby further reducing the possibility that water is stuck on the contact portion 120. Moreover, the lower portion 329 of the outside cover 321 forms a part of the outer side wall of the groove portion 330, and is inclined so that the position of the lower portion 329 becomes lower towards the receiving opening 342 side. Thus, the water wt that moves downwardly along the groove portion 330 flows outside the cap 30 more smoothly.

B. Other Embodiments

B-1. Second Embodiment

In the foregoing embodiment, the cap 30 has the groove portion 330 (FIG. 4). However, the cap 30 does not need to have the groove portion 330. Even when the cap 30 does not have the groove portion 330, the cap 30 has the second cover portion 320, thus it is possible to reduce the possibility that water is stuck on the contact portion 120. Also, in the foregoing embodiment, the outer peripheral portion of the second cover portion 320 is formed entirely by the outside cover 321 (FIG. 4). However, a part of the outer peripheral portion may be formed by the outside cover 321. For example, out of the outer peripheral portion of the second cover portion 320, a portion from the first end 34 through a midpoint between the first end 34 and the bottom portion 339 may be the outside cover 321, and a portion from the midpoint through the bottom portion 339 may be a cylindrical portion parallel to the central axis CX2. Even in this case, because the second cover portion 320 has the outside cover 321, even when water reaches the outside cover 321, the water that reaches the outside cover 321 is moved to the first cover portion 310 side.

B-2. Third Embodiment

In the foregoing embodiment, the high-pressure fuel gas is hydrogen gas, and the vehicle 1 is a fuel cell vehicle in which hydrogen gas is used as fuel. However, the disclosure is also applicable to other high-pressure fuel gas and a vehicle in which other high-pressure fuel gas is used. For example, the high-pressure fuel gas may be natural gas, and the vehicle 1 may be a vehicle that uses the natural gas as fuel. Even when high-pressure fuel gas other than hydrogen gas is supplied to the receptacle 10, water stuck on the contact portion 120 can freeze when atmospheric temperature is zero degrees Celsius or lower, or high-pressure fuel gas supplied is at zero degrees Celsius or lower. Then, the supply nozzle 23 and the receptacle 10 can be fixed to each other.

B-3. Fourth Embodiment

In the foregoing embodiment, in the attached state, the distal end of the inside cover 331 and the contact portion 120 are in contact with each other, or separated from each other at a small interval due to tolerance. However, the disclosure is not limited to this. For example, in the attached state, the distal end of the inside cover 331 and the contact portion 120 may be disposed at an interval that is not caused by tolerance. Even in this case, since the cap 30 has the groove portion 330 between the outside cover 321 and the inside cover 331, even when the water wt reaches between the outside cover 321 and the outer peripheral portion 130, at least a part of the water wt thus reached is still allowed to flow in the groove portion 330.

The disclosure is not limited to the embodiments described above, and includes various modifications. For example, the foregoing embodiments are described in detail in order to facilitate understanding of the disclosure, but the disclosure is not necessarily limited to those having all of the configurations described above. It is also possible to replace a part of the configuration of one of the embodiments with a configuration in a modified mode. Further, it is possible to add a configuration in a modified mode to the configuration of one of the embodiments. Also, addition of other configuration, and removal and replacement of a part of the configuration of each of the embodiments are possible. Further, it is possible to combine the embodiment, a modified mode, and a modification.

What is claimed is:

1. A vehicle in which high-pressure fuel gas is used, the vehicle comprising:
   a receptacle configured to fill the high-pressure fuel gas; and
   a cap that includes a receiving opening to be attached to the receptacle, and is attached to the receptacle in a detachable manner, the receiving opening being provided in one end of the cap, wherein:
   the cap includes a bottomed first cover portion comprising an open end connected to a second cover portion, and a closed bottom opposite the open end, and wherein the second cover portion comprises an open first end connected to the first cover portion and an open second end provided opposite the open first end and is provided on a side of the receiving opening with respect to the first cover portion;
   the second cover portion includes an outside cover that covers a contact portion of the receptacle, the contact portion coming into contact with a distal end of a supply nozzle for the high-pressure fuel gas when the supply nozzle is connected with the receptacle;
   the outside cover has a tapered shape such that an outer diameter of the outside cover is decreased towards the first cover portion from the one end of the cap where the receiving opening is provided; and
   the outside cover has an internal dimension that allows the outside cover to be separated from an outer peripheral portion of the receptacle in a state where the cap is attached to the receptacle.

2. The vehicle according to claim 1, wherein the second cover portion further includes an inside cover that is formed in an inner periphery of the cap on an inner side of the outside cover, and a groove portion formed by the outside cover and the inside cover.

3. The vehicle according to claim 2, wherein the inside cover has a length that allows a distal end of the inside cover to be in contact with the contact portion, and a tapered shape such that an outer diameter of the inside cover is decreased towards an opposite side of the contact portion in the state where the cap is attached to the receptacle.

4. The vehicle according to claim 1, wherein an upper portion of the outside cover being positioned above the receptacle slopes downward from a first end to the first cover portion in the state where the cap is attached to the receptacle.

* * * * *